United States Patent [19]

Sugita et al.

[11] Patent Number: 5,317,699
[45] Date of Patent: May 31, 1994

[54] SCHEDULE MANAGEMENT SYSTEM WITH COMMON MEMORY FOR MULTIPLE USERS

[75] Inventors: Koji Sugita, Tokyo; Yuji Izuwa, Hiroshima, both of Japan

[73] Assignee: NEC Corporation, Japan

[21] Appl. No.: 989,772

[22] Filed: Dec. 14, 1992

[30] Foreign Application Priority Data

Dec. 27, 1991 [JP] Japan .................................. 3-360213

[51] Int. Cl.5 ............................................ G06F 13/00
[52] U.S. Cl. .................................... 395/325; 395/200;
368/28; 434/108
[58] Field of Search ........................ 395/650, 200, 325;
368/28, 29, 41, 72, 82; 340/309.4; 434/108

[56] References Cited

U.S. PATENT DOCUMENTS

| | | | |
|---|---|---|---|
| 4,162,610 | 7/1979 | Levine | 58/148 |
| 4,969,136 | 11/1990 | Chamberlin et al. | 369/29 |
| 5,093,813 | 3/1992 | Levine | 368/10 |
| 5,113,380 | 5/1992 | Levine | 368/10 |
| 5,124,912 | 6/1992 | Hotaling et al. | 364/401 |
| 5,128,981 | 7/1992 | Tsukamoto et al. | 379/58 |

Primary Examiner—Eddie P. Chan
Attorney, Agent, or Firm—Laff, Whitesel, Conte, Saret

[57] ABSTRACT

A schedule management system has a dispersive management unit. A data communication unit provides for communicating between a common schedule data storage memory units and for updating the schedule data which is so commonly stored. Data storage is based on the names of the storage unit and the user's, which names are transmitted from the schedule data storage unit. The schedule data storage unit may be updated from the storage unit management table in order to transmit the updated information to the other schedule data storage units. Therefore, the adjustment of the schedule can be effectively realized even among the remote users so that every one will be aware of the update data.

1 Claim, 3 Drawing Sheets

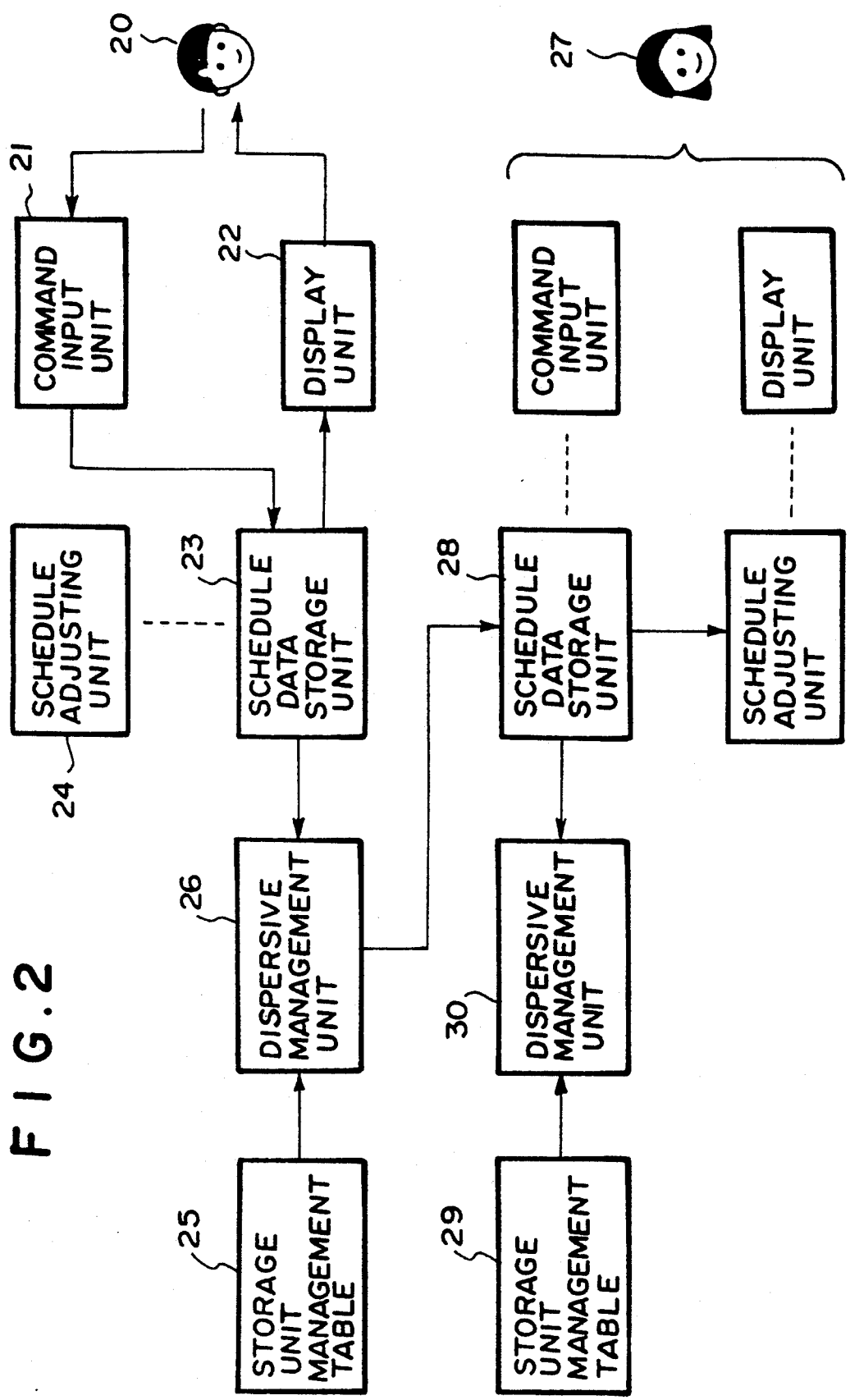

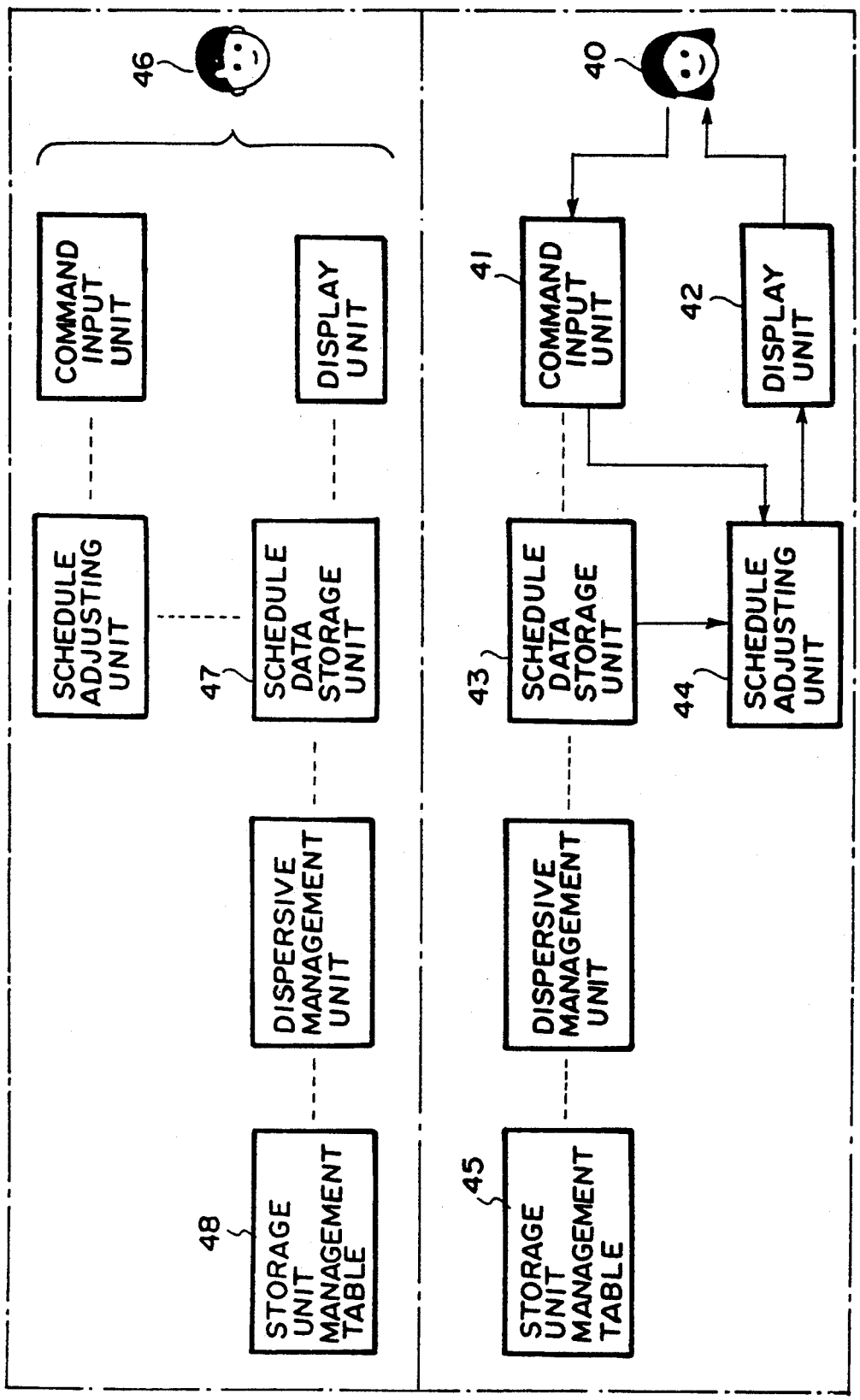

5,317,699

SCHEDULE MANAGEMENT SYSTEM WITH COMMON MEMORY FOR MULTIPLE USERS

BACKGROUND OF THE INVENTION

The present invention relates to a system for managing schedule information which is utilized in the field of OA (office automation) or HA (home automation), and more particularly to a schedule management system for supporting a schedule adjustment made between remote users.

Conventionally, in this type of system, user's schedule data is stored only within a specific schedule data storage unit, and a command input unit operated by the user can create instructions to only one schedule data storage. Therefore, the schedule adjusting function has been available only the restricted users whose data is stored within the single data storage, which can be operated via the command input unit by the users.

In such a conventional system, however, when the users are scattered at the remote locations, it has been impossible to share the schedule adjusting function among the remote users, since the schedule data storage unit is provided for each group of users.

SUMMARY OF THE INVENTION

Therefore, it is an object of the present invention to provide a schedule management system which allows the schedule to be effectively adjusted even among the remote users, which can eliminate the foregoing drawback inherent to the prior art system.

According to the present invention, there is provided a schedule management system for storing and managing a schedule data such as the time of day or the like for the job schedule for a plurality of users, which comprises:

a command input unit provided for the entry of desired schedule of each of the users;

a display unit for displaying a schedule information;

a plurality of schedule data storage units for storing the user's schedule data for each of the users supplied from the command input unit;

a schedule adjusting unit for finding the free time of the user in question by referring to the schedule data during the specified period of time stored in the storage unit; and a dispersive management unit having a storage unit management table for storing the relationship between the schedule data storage units for each user and data communication means for communicating between the schedule data storage units.

The schedule management system according to the present invention allows for remote users each using a different schedule data storage unit to adjust their schedule, while allowing them to utilize more effectively the schedule adjusting function.

BRIEF DESCRIPTION OF THE DRAWINGS

FIG. 2 is a block diagram of a specific example of the operation added on the user's schedule data on the schedule data storage unit illustrated in FIG. 1; and FIG. 3 is a block diagram of the schedule adjustment among the users in the system illustrated in FIG. 1.

DESCRIPTION OF THE PREFERRED EMBODIMENTS

Figure 1:
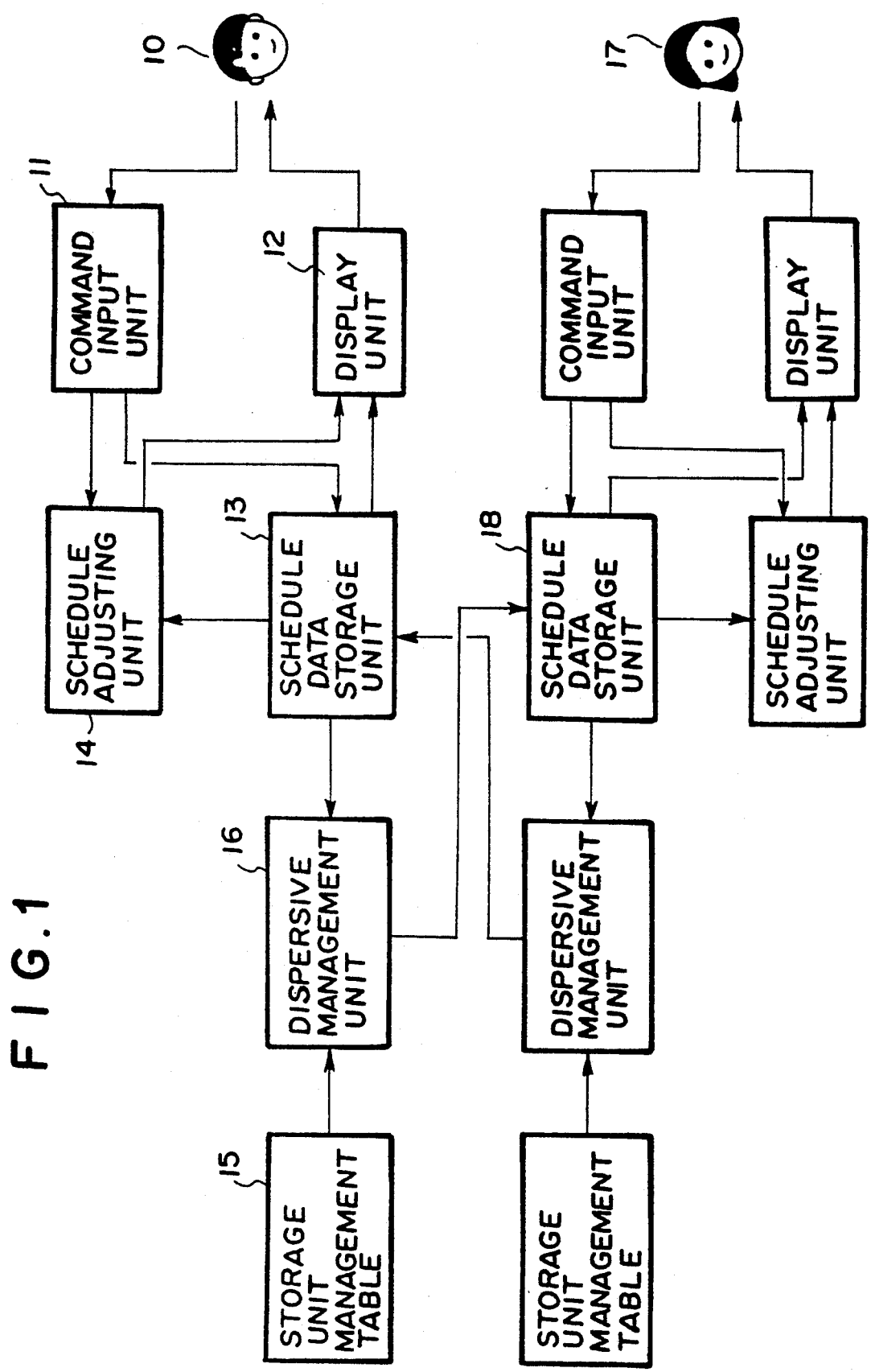
FIG. 1 is a block diagram of a specific embodiment of the schedule management system according to the present invention.

Referring to FIG. 1, a schedule management system embodying the present invention comprises a command input unit 11, a display unit 12, a schedule storage unit 13, a schedule adjusting unit 14, a storage unit management table 15 and a dispersive management unit 16.

The command input unit 11 transmits a series of instructions to, for example, store, erase, reference to the schedule data or adjust the schedule to each unit by the operation of the user 10, which corresponds to the terminal or the work station in a general computer system.

The display unit 12 may be a CRT display unit having a screen, on which the execution result of the instruction, which is transmitted via the command input unit 11 to each unit by the user 10, is visually presented to the user.

The schedule data storage unit 13 executes the instruction from the user 10, which is transmitted via the command input unit 11, by, for example, a new schedule data, erasing or returning the old one, and output the result to the display unit 12. The schedule adjusting unit 14 references to user's schedule data over a specific period of time, which is stored on the connected schedule data storage unit 13, in accordance with the schedule adjusting instruction from the user 10, which is transmitted via the command input unit 11, to evaluate their free time to emit the result to the display unit 12.

The storage unit management table 15 comprises a data table for storing two kinds of information for each user: the information on the "regular" schedule data storage unit 13 within which the schedule data is actually stored by the user 10; and the information on the "auxiliary" schedule data storage unit 18 within which the schedule data is stored by another user 17, who wants to adjust the schedule with the user 10 as the other party.

The dispersive management unit 16 has the storage unit management table 15, based on which the instruction issued via the command input unit 11 to a specific schedule data storage unit 13 by the user 10 is also issued to the other schedule data storage unit 18.

Next, the operation of the schedule management system will be described with reference to FIG. 2. Let us assume that, in the storage unit management tables 25, 29 which are similar to those of FIG. 1, another user 20 sets the schedule storage unit 23 as the regular, and the schedule storage unit 28 as the auxiliary. If the user 20 enters a schedule data to the command input unit 21, then the latter 21 transmits user's name, storing instruction and the schedule data to the schedule data storage unit 23. The schedule data storage unit 23 stores it according to the transmitted storing instruction, and informs the display unit 22 to that effect while transmitting the name of the storage unit, user's name, storing instruction and the schedule data to the dispersive management unit 26.

The display unit 22 presents the result to the user 20.

The dispersive management unit 26, based on the name of the storage unit and the user's name, determines from the storage unit management table 25 whether the schedule data storage unit 23 whose data has been updated is the regular one or the auxiliary. If it is the auxiliary, then the dispersive management unit 26 transmits the name of the schedule data storage unit 23, user's name, storage instruction and the schedule data to the auxiliary schedule data storage unit 23 by means of its own data communication means.

The schedule storage unit 28 stores the schedule data according to the transmitted storage instruction, and further transmits its own name, user's name, storage instruction and the schedule data to the dispersive management unit 30. The dispersive management unit 30, based on the name of the storage unit 28 and the user's name, determines from the storage unit management table 29 whether the schedule data storage unit 28 whose schedule data has been updated is the regular one or the auxiliary. If the latter is the case, it ends the operation.

According to the foregoing operation, the schedule data is stored into the schedule data storage unit 23 into which it is to be truly stored and into the schedule data storage unit 28 used by user 27 who wants to interact with the user 20 about the adjustment of the schedule.

Referring to FIG. 3, let us assume that, in the storage unit management tables 45 and 48, as in FIG. 2, the user 46 sets the schedule storage unit 47 as the regular and the schedule storage unit 43 as the auxiliary and that the user 40 sets the schedule storage unit 43 as the regular and the schedule storage unit 47 as the auxiliary. When the user 40 adjusts the schedule shared with the user 46 through the command input unit 41, the command input unit 41 transmits the user's name, adjusting instruction and the adjusting time to the schedule adjusting unit 44, which references to the associated schedule data storage unit 43 for the user 40's and user's schedule data over the adjusting period of time to find their free time to inform the display unit 42, which visually presents the information on the informed free time to the user 40.

According to the foregoing operation, adjustment of the schedule can be realized between the users 40 and 46 each utilizing a different schedule data storage unit.

What is claimed is:

1. A schedule management system comprising a plurality of user stations;

command means and display means coupled to a schedule data storage unit at each of said user stations for entering, displaying, and storing scheduling data;

management table means individually associated with each user station for storing information indicating regular schedule data entered by the user at the individually associated station and auxiliary schedule data entered by a user at a station other than the individually associated station;

said schedule data being stored in said schedule data storage unit under addresses accompanying entered data;

a plurality of dispersive management means, each of said dispersive management means being coupled between an individually associated one of said schedule data storage units and the management table means associated with that user station, each of said dispersive management means determining from received data and the management table associated therewith whether said received data is related to said regular or to said auxiliary data;

means for intercoupling the plurality of dispersive management means and schedule data storage units so that each dispersive management means directs received data to any of said schedule data storage units at a station other than the individually associated station; and said dispersive management means including means responsive to a detection of received auxiliary data for directing a storage of the auxiliary data in the schedule data storage unit individually associated with the user station identified by the address accompanying said auxiliary data, and said dispersive management means including means responsive to a detection of regular data for not directing a storage of the received regular data.

* * * * *